United States Patent
Datta

(10) Patent No.: US 11,303,663 B2
(45) Date of Patent: Apr. 12, 2022

(54) DATA PROTECTION AND SECURITY FOR IN-VEHICLE SYSTEMS

(71) Applicant: Harman International Industries, Incorporated, Stamford, CT (US)

(72) Inventor: Souvik Datta, Pune (IN)

(73) Assignee: Harman International Industries, Incorporated, Stamford, CT (US)

( * ) Notice: Subject to any disclaimer, the term of this patent is extended or adjusted under 35 U.S.C. 154(b) by 23 days.

(21) Appl. No.: 16/046,925

(22) Filed: Jul. 26, 2018

(65) Prior Publication Data
US 2019/0058728 A1    Feb. 21, 2019

(30) Foreign Application Priority Data
Jul. 31, 2017 (EP) .................................. 17184051

(51) Int. Cl.
*H04L 29/06* (2006.01)
*H04L 9/32* (2006.01)
(Continued)

(52) U.S. Cl.
CPC .......... *H04L 63/1441* (2013.01); *G06F 21/60* (2013.01); *H04L 9/3213* (2013.01); *H04L 9/3228* (2013.01); *H04L 63/0838* (2013.01); *H04L 63/0853* (2013.01); *H04L 63/20* (2013.01); *H04L 67/1097* (2013.01); *H04L 67/12* (2013.01); *G06F 2221/2149* (2013.01);
(Continued)

(58) Field of Classification Search
CPC . H04L 63/1441; H04L 9/3213; H04L 9/3228; H04L 63/0853; H04L 67/12; H04L 63/20; H04L 67/1097; H04L 63/0838; H04L 2463/082; H04L 2209/84; G06F 21/60; G06F 2221/2149
See application file for complete search history.

(56) References Cited

U.S. PATENT DOCUMENTS

2012/0233675 A1* 9/2012 Hird .................... H04L 63/0838
726/6
2013/0124006 A1* 5/2013 Anantha ................ G06Q 50/30
701/1
(Continued)

FOREIGN PATENT DOCUMENTS

WO    2015019104 A2    2/2015

OTHER PUBLICATIONS

Jilani et al., "Advanced Car Security System," Jun. 2017, pp. 165-169, (Year: 2017).*
(Continued)

*Primary Examiner* — Luu T Pham
*Assistant Examiner* — Canh Le
(74) *Attorney, Agent, or Firm* — Artegis Law Group, LLP

(57) ABSTRACT

Methods and systems for ensuring security of in-car systems in vehicles, particularly, user data privacy and protection of in-car systems from cyber attacks, hacking etc. is provided. After a two-level authentication process, wherein user identification data, token and passwords are used and matched to authenticate the user, a secure OS container is created for use for the user accessing the IVI system of the vehicle. This container is created on the host root file system such that the environments of the container and the host root file system of the IVI system are sandboxed from each other.

13 Claims, 3 Drawing Sheets

(51) Int. Cl.
    *H04L 67/12*     (2022.01)
    *G06F 21/60*     (2013.01)
    *H04L 67/1097*     (2022.01)

(52) U.S. Cl.
    CPC .... *H04L 2209/84* (2013.01); *H04L 2463/082* (2013.01)

(56) References Cited

U.S. PATENT DOCUMENTS

| | | | | |
|---|---|---|---|---|
| 2014/0108793 | A1* | 4/2014 | Barton | G06F 21/6218 713/165 |
| 2014/0189888 | A1* | 7/2014 | Madhok | H04L 63/0807 726/29 |
| 2015/0089607 | A1* | 3/2015 | Hubner | H04L 63/0838 726/6 |
| 2015/0185034 | A1* | 7/2015 | Abhyanker | G06Q 50/01 701/23 |
| 2015/0319174 | A1 | 11/2015 | Hayton et al. | |
| 2016/0192011 | A1* | 6/2016 | Toh | G06F 3/0481 725/37 |
| 2017/0078278 | A1* | 3/2017 | Hong | H04L 63/0838 |
| 2017/0300697 | A1* | 10/2017 | Iyer | G06F 21/44 |
| 2017/0366521 | A1* | 12/2017 | Lei | H04W 4/14 |
| 2018/0018833 | A1* | 1/2018 | Kannappa | G06F 16/22 |
| 2018/0025328 | A1* | 1/2018 | Penilla | G06Q 10/1095 705/305 |
| 2018/0070233 | A1* | 3/2018 | Soni | H04W 12/06 |
| 2018/0332472 | A1* | 11/2018 | Lu | H04W 12/06 |

OTHER PUBLICATIONS

Paul Moskowitz et al., "Frame for Security and Privacy in Automotive Telematics" Sep. 28, 2002, pp. 25-32. (Year: 2002).*
European Search Report for Application No. EP 17 18 4051, dated Sep. 25, 2017.

* cited by examiner

DATA PROTECTION AND SECURITY FOR IN-VEHICLE SYSTEMS

CROSS-REFERENCE TO RELATED APPLICATIONS

This application claims priority to the co-pending European patent application titled, "DATA PROTECTION AND SECURITY FOR IN-VEHICLE SYSTEMS," filed on Jul. 31, 2017 and having Serial No. EP17184051.5. The subject matter of this related application is hereby incorporated herein by reference

TECHNICAL FIELD

The present invention generally relates to protection of data and ensuring of security of in-car systems in VEHICLES. More particularly it relates to user data privacy and protection of in-car systems from cyber attacks, hacking etc.

BACKGROUND OF THE INVENTION

People today are looking at comfortable travel experiences and car renting and sharing are becoming more and more common. Rental car companies and car sharing applications are seeing an ever increasing popularity.

With more and more advances in vehicle infotainment systems, car makers are attempting to create a seamless experience for a user by increasing the level of vehicle personalization. Nowadays cars are no longer just be used for reaching from one point to another but also becoming a storehouse of personal information, something akin to a smartphone, home automation system or a personal computer, syncing and storing important user data.

Modern day cars come equipped with state of the art infotainment or in-car entertainment systems. These infotainment systems let the user connect, or "pair," his/her smartphone or other personal device via Bluetooth with the car. This enables the user of the car to use various features like listening to his/her favorite music, watch movies, and hear audio books for entertainment. They also enable the user of the car to stay connected with friends and family through social networking sites, make phone calls, update GPS location, track the car etc. while driving. Such personally identifiable information; like location data, address books, sometimes even credit card numbers, call logs; enters and leaves the confines of the vehicle, especially in rental cars, where a car exchanges many hands.

But all this comfort comes with a cost—the cost of potentially putting the user of the car at a substantial risk of security and/or data theft. This raises the question whether appropriate privacy and data protection is being taken into consideration in such environments.

In rental car environments, the ease of renting cars comes with the problem of increased security risks. When a user or a customer of a rental car connects his/her gadget to the car with Bluetooth, or through a cable, the car infotainment system stores the phone number to make it easier to connect later. It may also store the call logs, including any contacts that were dialed by the user. This leads to the danger of the information being stored in the car's infotainment system for the next renter to find, or even worse, for a hacker to lay hands on.

Therefore, there is an ever increasing need to ensure data privacy of the customer who has hired a car, both at run time as well as at the end of the rental tenure.

The other related issue that is observed often with rental cars is that rental cars can become a safe experimental ground for hackers. The hacker might mount different experimental attacks to find the vulnerability of the system. This information, in the worst case, might lead to a bigger class attack. The other motivation of the hacker could be to find traces of data left behind by the previous customers.

An easy solution to avoid theft of personal data is that the user can choose to delete all such saved data from the infotainment system before leaving the car or before returning the car to the rental company. However, in doing so, there is a danger that the core infotainment system may get affected or damaged in some situations, for example, when the user is in a hurry to deposit the car. Or, the user may purposefully meddle with the infotainment system of the car for malicious purposes. Or, as mentioned above, a hacker might introduce spyware that puts the infotainment system, together with the customer's data, at risk.

Therefore, there exists a need for protection against user data theft that also ensures security and safety of in-car infotainment systems, particularly in rental cars.

SUMMARY OF THE INVENTION

According to an embodiment, there is provided a method and a system for protecting user data privacy and securing host in-vehicle infotainment-IVI system in a vehicle.

In other words, using the disclosed method and system the customer is able to bring in his/her data, use the data, and finally carry away the data without any compromise in data privacy. Moreover, the customer does not have the privilege to impact/infect the security of the core system unknowingly through some external threat surface.

Therefore, the method and the system disclosed herein secure the privacy of the brought-in data by the user and the data that the user uses in transit while owning the vehicle or using the rented vehicle. Moreover, the present method and system also offer the feature that the private data of the user may be backed up in the cloud and also securely erased from the vehicle when needed without interfering with the host root file system of the vehicle's infotainment system.

The present method and the system additionally protect the in-vehicle system from an adversary, who may hire the car to use it as an experimental platform to find vulnerabilities of the in-vehicle system and later use his/her findings to mount attacks.

The method disclosed herein comprises a backend server receiving user identification data. The backend server then generates a unique token on the basis of the user identification data. The backend server transmits the token to a device for presentation to the user. An IVI system at a car receives first user input data. The IVI system transmits the first user input data to the backend server. The backend server, in response to determining that the first user input data corresponds to the token, generates a one-time password, OTP, on the basis of the token; and transmits the OTP to the IVI system and to a mobile device (208) of the user. The IVI system next receives second user input data and, in response to determining that the second user input data corresponds to the OTP, creates a secure container within the IVI system for access by the user.

In an embodiment the backend server saves the token in a memory unit. This ensures faster retrieval of the token from the memory when needed by the backend server.

In one embodiment the secure container is a custom root file system instantaneously created on a host root file system of the IVI system. This enables creation of a temporary secure environment on the IVI system which is sandboxed from the host root file system of the IVI system.

In one embodiment the custom root file system exists on the host root file system as a directory and is protected through host security policies. This ensures protection of the secure container through host security policies.

In an embodiment the host security policies are active security policies. This enables the host and consequently the secure container to be controlled through active security policies, thus warding off security threats.

In another embodiment, user data and user applications are confined to the secure container such that the user data and application running on the custom root file system inside the container does not impact applications and associated data running on the host root file system of the IVI system. This sandboxing of environments ensures that no hacker can break through the container to enter and meddle with the host root file system of the IVI system. The applications and data are kept separated from each other, thus also ensuring safety and privacy of personal user data.

According to another embodiment the user identification data comprises at least one of user's name, user's mobile number, user's address, user's e-mail address, user's driving license number, user's personal identification information or user's biometric information. The user identification data or parameters must uniquely identify the user and be known to him and not be only publicly known information about the user.

In yet another embodiment a backup of data available in the secure container is taken on a backup server and the secure container is deleted from the host IVI system when the user logs out of the IVI system. In another embodiment the backup server is available as a cloud based service and the backup of the user data is stored in a network cloud. The deletion of data from the IVI system ensures that the user data is not mishandled or misused and data privacy is maintained after the user hands over the car. The feature of being able to save user data on a backup server or on the cloud network allows the user to access this data at a later point of time. The user may also be able to use and sync this stored data on another car's IVI system, which he/she may drive in future.

In an embodiment communication between the backend server and the IVI system is performed over a secure communication channel. This has the advantage of lowering risk of interceptions by unauthorized persons or hackers.

According to an embodiment the IVI system is an automotive infotainment head unit in a car shared by a plurality of users. Each user can bring with him/her the data that he/she is willing to use during the time he/she uses the vehicle. And the user can safely take away the data without leaving any traces of information for the next user to lay his/her hands upon.

In an embodiment the secure container is created temporarily only, and/or wherein data is stored within the secure container temporarily only. This temporary state of the container and the data within ensures that the data is not left in the system making it vulnerable for future attacks.

The system disclosed herein comprises a backend server and an in-vehicle infotainment, IVI, system. The backend server is arranged to receive user identification data and generate a unique token on the basis of the user identification data. The backend server is arranged to next transmit the token to a device for presentation to the user. The IVI system is arranged to receive first user input data and to transmit it to the backend server. The backend server, in response to determining that the first user input data corresponds to the token, generates a one-time password, OTP, on the basis of the token, and transmits the OTP to the IVI system and a mobile device of the user. Next, the IVI system receives second user data and, in response to determining that the second user input data corresponds to the OTP, the IVI system creates a secure container within the IVI system for access by the user.

According to an embodiment the transmitted OTP is stored on a local cryptographic storage unit (301a) in the IVI system. This ensures security of the OTP and makes it difficult for unauthorized persons to gain access to.

In accordance with another embodiment, there is provided a computer-program product having a non-transitory computer readable medium storing computer executable code which, when executed by computer, causes the above method to be performed.

It is noted that the terms "rental" and "shared" cars are used interchangeably and relate to vehicles that are intended for temporary use by a plurality of users.

BRIEF DESCRIPTION OF THE DRAWINGS

The present invention may be better understood from reading the following description of non-limiting embodiments, with reference to the attached drawings, wherein.

DETAILED DESCRIPTION OF THE PREFERRED EMBODIMENTS

Figure 1:
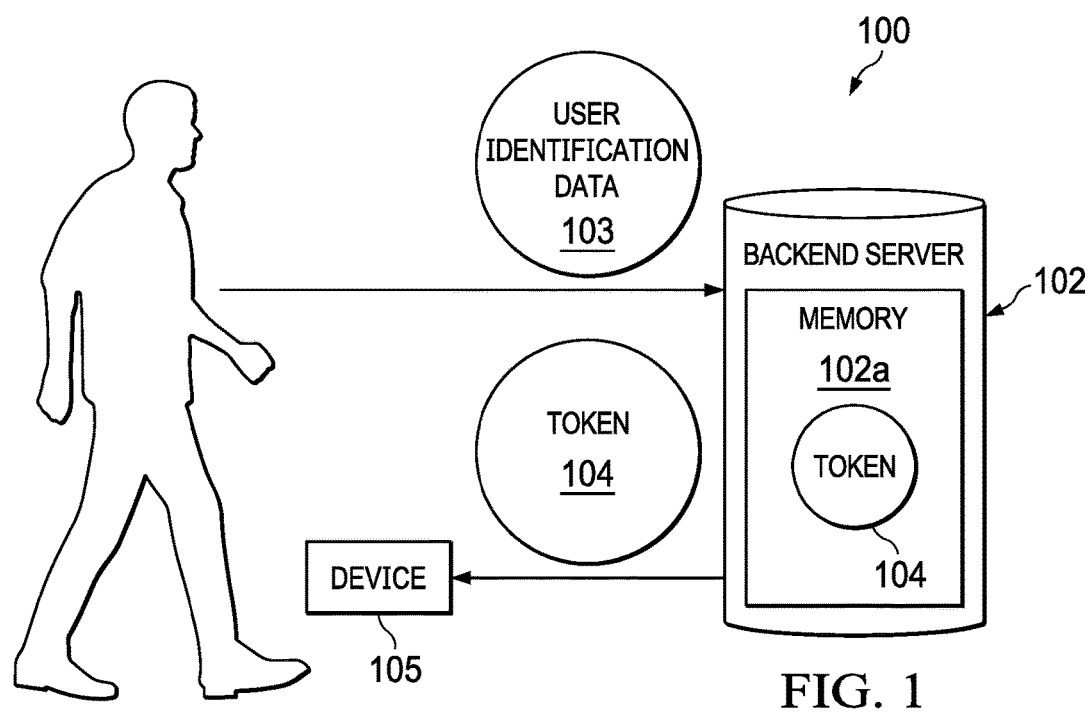
FIG. 1 schematically shows an example system in accordance with one of a number of embodiments.

In an ordinary in-car or in-vehicle infotainment (IVI) system a user is allowed access to the system the moment he/she switches it on and the IVI system makes its features available to the user based on user choices and selections. The user can then choose to use, for example, the GPS service to reach a certain destination and at the same time connect his/her mobile phone to the IVI system to play music on the car audio system. Therefore, a user is given full access to the IVI system without any authenticity check being carried out for the user.

However, the system and method disclosed herein establish a safe environment wherein neither the user's data nor the security of the IVI system is compromised.

According to the disclosed system and method, the user of a vehicle, who may be hiring the vehicle, registers himself/ herself with a backend system. This backend system may be owned by a car rental company. As a part of user registration step, the backend system requests or prompts for entering of data by the user that would uniquely identify the user or the person who is going to use the vehicle or hire the vehicle. Such unique identification data or parameters could be user's mobile number, Social Security Number, biometric information like finger or retina scan, or any other such data that uniquely identifies the user. Based on the information provided by the user, the backend system would generate a unique token and store the same in its persistent memory. The backend server would then transmit the token for presentation to the user. The user may receive the token generated from the backend server at a device, which may be a personal device of the user, or the registration desk or kiosk of the car company.

In an alternative embodiment, the backend server does not transmit the token for presentation to the user, rather only saves it in the memory for later use.

When the user of the vehicle starts using the IVI system in the car, for the first time in his/her rental tenure or for the first time in his/her personal use, the IVI system would prompt the user to enter the token received at the time of registration. After obtaining the token from the user as the first user input at the IVI system, the IVI system would send first user input over a secure channel to the backend system. The backend system then checks if the token received as the first user input matches the token generated at the time of user registration which was saved in the memory of the backend server. On identifying a correct match the backend system or server would generate a password, for example a one-time password (OTP), and send it to a registered mobile phone of the user. It would also send the password over a secure channel to the IVI system.

In the alternate embodiment, when the user of the vehicle starts using the IVI system in the car, for the first time in his/her rental tenure or for the first time in his/her personal use, the IVI system would prompt the user to enter his/her unique identification data or parameters, the same information that the user had earlier entered during registration. After obtaining the parameters, the IVI system would send these parameters over a secure channel to the backend system. The backend system would re-compute the token from the received parameters and if the recomputed token matches with the token which the back end system had generated during the time of user registration, the backend system or server would generate a password, for example a one-time password (OTP), and send it to a registered mobile phone of the user. It would also send the password over a secure channel to the IVI system.

On receiving the password, the user would enter the password at the prompt of the IVI system. The IVI system would compare the user entered password with the password that it received from the backend system or server and if they are found to be matching, the IVI system would start an operating system container.

The container started by the IVI system may be a least privileged container with active security policies. The container may run the IVI human-machine interface (HMI) and associated services from within itself and sandbox its environment from the host environment. In this way, the applications that are run by the user inside the container would not impact the application and associated data that are running or present in the host root file system.

It is common practice for the user of a rented car, to download his/her personal data to the IVI system from cloud, like pictures, favorite media playlist or bring in that data in an external storage so that he/she can remain connected to social network or enjoy his/her songs or movies. The user might also perform e-commerce transaction or use his/her credit card to pay toll through the IVI system during his/her rental tenure. All data that user downloads or brings in the system (if copied to IVI), would be securely stored inside the container At the end of the rental tenure, the system may give the user an option to take a back-up of his/her data to the cloud through a secure channel. Once the backup of the data is complete, the user may be prompted to securely delete the data. On asserting to the prompt, all data that the user downloaded or stored in the container would be purged permanently from the system and the container would be stopped. Finally, the IVI system may inform the backend system to delete the user profile information.

Referring now to FIG. 1, it shows an example system 100 in accordance with one of a number of embodiments. The system 100 comprises a backend server 102. The user, who is going to drive the vehicle or who is hiring the vehicle, registers himself at a front desk or kiosk of the car company or rental company. As a part of the user registration process, the front desk receives the user identification data 103 from the user and uploads onto a backend server 102. The backend server 102 generates a unique token 104 based on the user identification data 103 received from the user. The backend server 102 saves the token 104 in its persistent memory 102a. This unique token 104 may be presented to the user through a device 105. This device 105 may be the kiosk of the car company or a personal mobile device of the user. As an alternative, the unique token 104 is presented to the user at the front desk physically.

According to another alternative embodiment the token 104 is merely saved in the memory 102a of the backend server 102, without sending it to the user.

Figure 2:
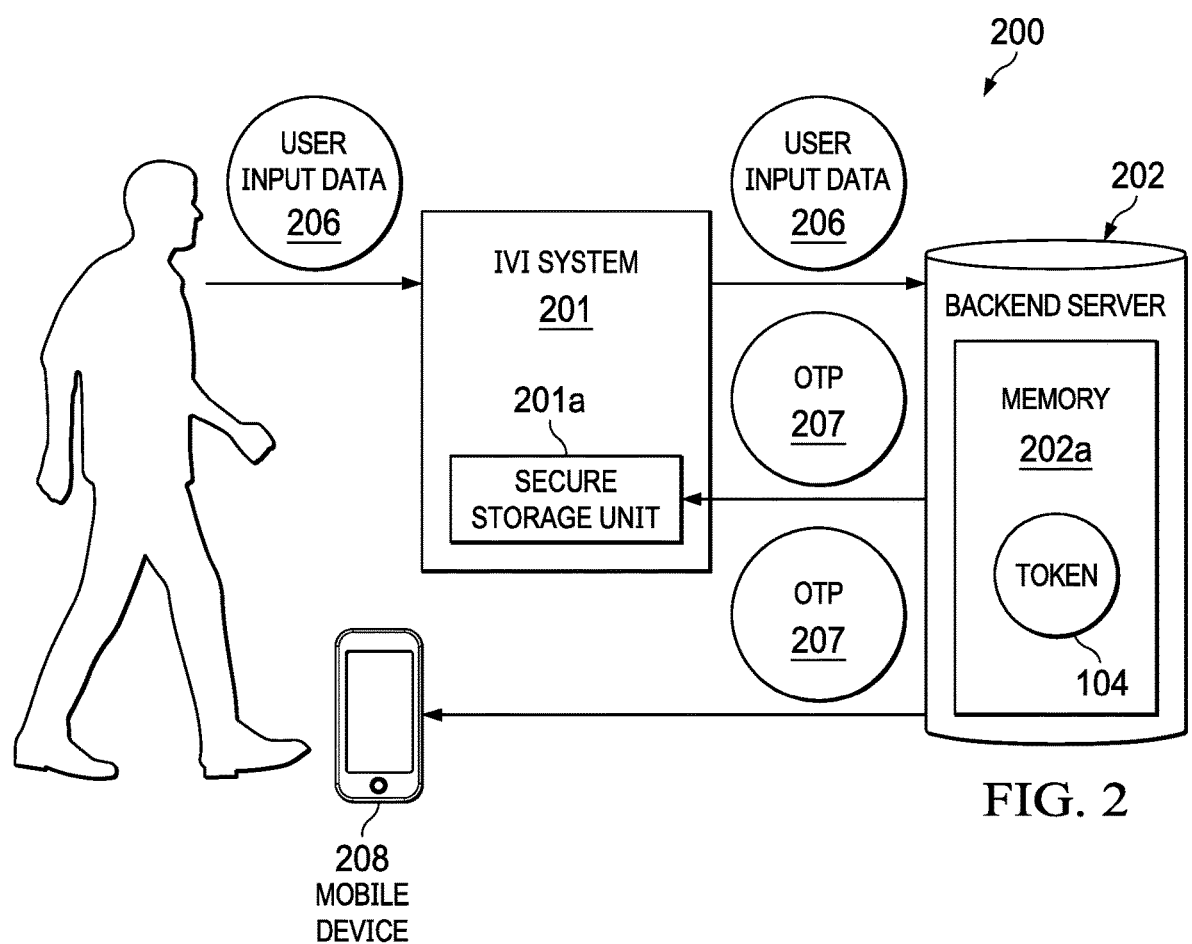
FIG. 2 schematically shows another example system in accordance with one of a number of embodiments.

FIG. 2 shows another example system 200 in accordance with one of a number of embodiments. As can be seen from FIG. 2 the user provides a first user input data 206 to the IVI system 201. The IVI system 201 transmits the first user input data 206 to the backend server 202. The backend server 202 compares the first user input data 206 to the token 104 saved in its persistent memory 202a.

According to the alternative embodiment the backend server 202 computes a second token from the first user input data 206. And the backend server 202 checks if the token saved in its persistent memory matches the second token.

On determining that the first user input data 206, or alternatively, the second token, matches the token 104 saved in its memory 202a, the backend server 202 generates a one-time password 207, OTP, on the basis of the token 104. This OTP 207 is transmitted over a secure channel to the IVI system 201. The IVI system 201 stores this OTP 207 on a secure storage unit 201a. The OTP 207 is additionally, may be at the same time, also sent to a mobile device 208 registered with the user and is accessible to the user at the time the user is attempting to gain access to the IVI system 201.

According to the alternative embodiment, the backend server 202 computes a second token from the first user input data 206. The first user input data 206 should ideally be identical to the user identification data 103 that the user had presented at the time of user registration process. On determining that the second token matches the token 104 saved it its memory 202a, the backend server 202 generates a one-time password 207, OTP, on the basis of the token 104. This OTP 207 is transmitted over a secure channel to the IVI system 201. The IVI system 201 stores this OTP 207 on a secure storage unit 201a. The OTP 207 is additionally, also sent to a mobile device 208 registered with the user and is accessible to the user at the time the user is attempting to gain access to the IVI system 201.

Figure 3:
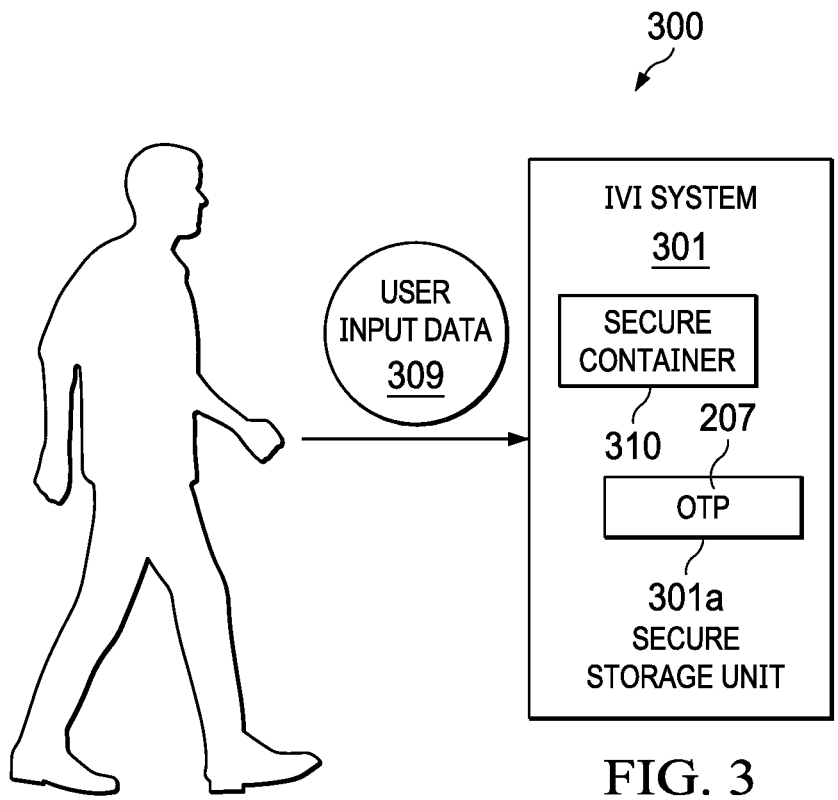
FIG. 3 schematically shows yet another example system in accordance with one of a number of embodiments.

FIG. 3 depicts another example system 300 in accordance with one of a number of embodiments. According to FIG. 3, the IVI system 301 receives a second user input data 309. This second user input data 309 is entered by the user when the user wants to access the IVI system 201. The IVI system 301 then determines if the second user input data 309 corresponds to the OTP 207 saved in its secure storage unit 301a. If the IVI system 301 finds that the OTP 207 saved in its secure storage unit 301a matches the second user input data 309 the IVI system 301 creates a secure container 310 within the IVI system 301 for access by the user.

Figure 4:
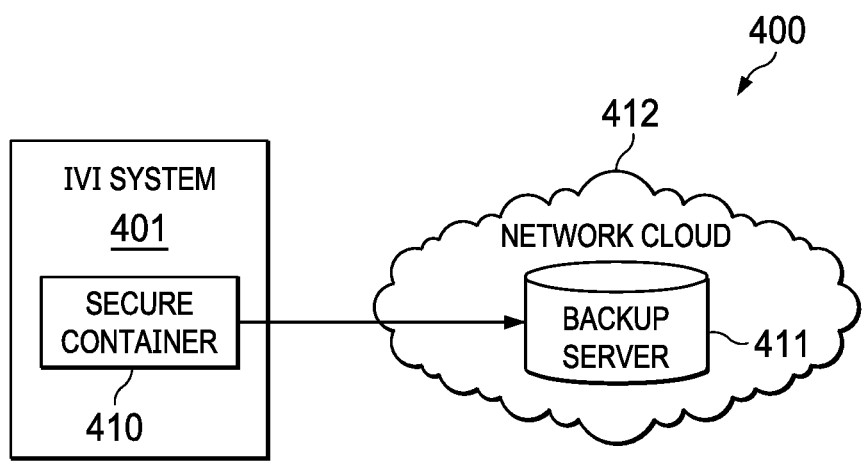
FIG. 4 schematically shows yet another example system in accordance with one of a number of embodiments.

FIG. 4 shows yet another example system 400 in accordance with one of a number of embodiments. As seen from FIG. 4, a backup of the content of the secure container 410 in IVI system 401 is saved in a network cloud 412 on a backup server 411. The user can choose the option of saving his/her data from the secure container 410 onto the cloud network 412 before deleting the data at the time of handing over the vehicle to the company, or in the case that the user decides to not use the vehicle for some time wherein his/her data, available in the secure container 410, might be exposed to a potential risk at the hands of another driver or hacker or an unauthorized person.

Figure 5:
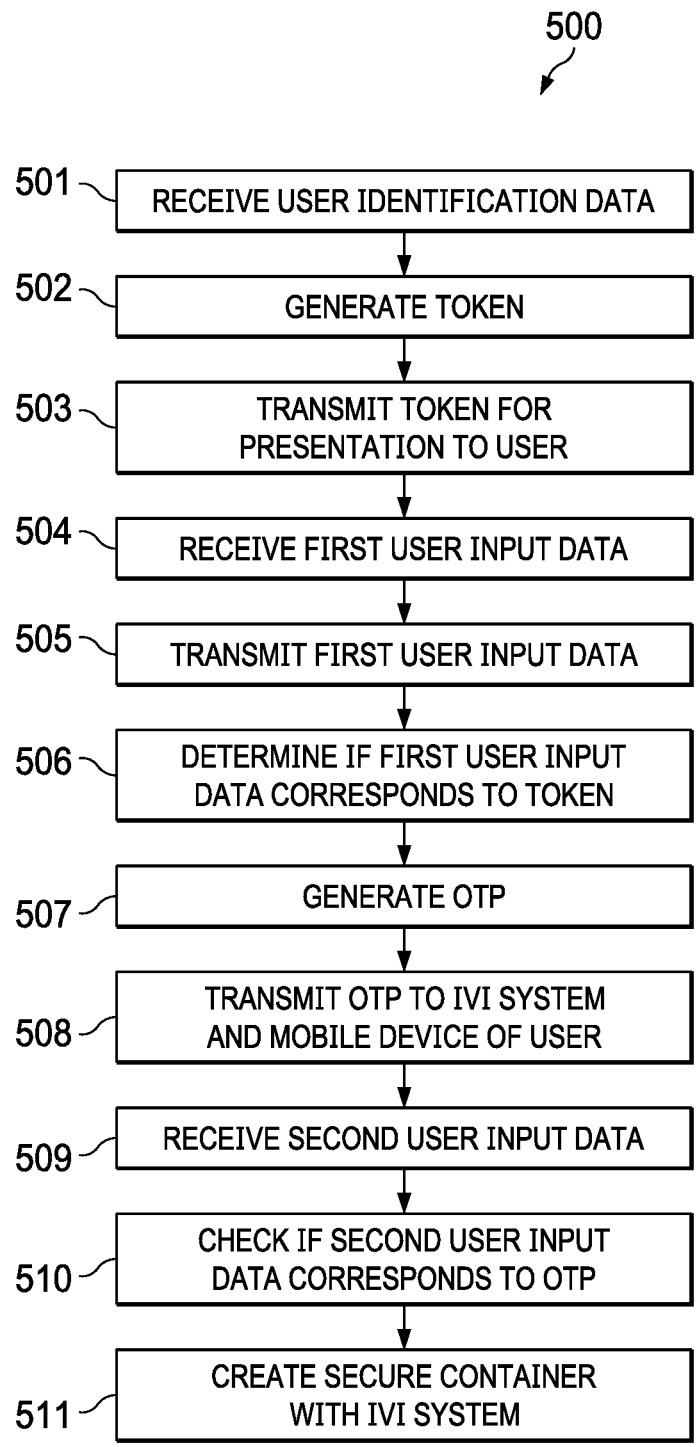
FIG. 5 is a flow chart for an example method in accordance with one of a number of embodiments.

FIG. 5 is a flowchart illustrating a method 500 in accordance with one of many embodiments. The method 500, as depicted in FIG. 5, comprises a first step 501 of receiving user identification data at a backend server. The backend server may be located at a registration desk of a vehicle company where the user goes to register himself/herself before taking possession of the vehicle for rent or personal use. The user identification data may be any data that identifies a user. It may be a single data element, a group of data elements or a combination of data elements.

On receiving the user identification data, as the next step 502, the backend server generates a unique token on the basis of the user identification data. This token may be derived from the user identification data using an algorithm that generates a random yet a unique token which is not easily derivable based merely on the user identification data, without the knowledge of the algorithm used.

The next step 503 involves the backend server transmitting the token to a device for presentation to the user. The token transmission happens over a secure channel. Either the token is presented in person to the user so that no interception is possible. Or the token is presented to a device belonging to the user, therefore, again not easily obtainable or intercepted by an unauthorized person. The backend server also keeps a copy of this token on a storage unit/memory.

In the next step 504 the IVI system receives first user input data. In this step 504 the user may approach and enter the vehicle, and initialize the IVI system. On initialization the IVI system may prompt the user to enter an input as the first user input data.

On receiving the first user input data, in the subsequent step 505, the IVI system transmits the first user input data to the backend server. In the next step 506 the backend server determines if the first user input data corresponds to the token previously saved in its memory.

On determining that the first user input data corresponds to the token previously saved in its memory, the backend server generates a one-time password, OTP, on the basis of the token in the next step 507. This OTP may be generated using or derived from the token already available with the backend server using an algorithm. The OTP, in another embodiment, is generated randomly and the value of the OTP is independent of the token. Therefore, every time a new OTP may be generated, given the same token.

In the following step 508, the backend server transmits the OTP to the IVI system and also to a mobile device of the user. This transmission takes place over a secure channel so that no one can intercept the information transmitted. According to an embodiment, the mobile device of the user is previously registered and the information, for example, the phone number of the user or the e-mail id, necessary for sending the OTP to, is already available at or known to the backend server. The IVI system stores this OTP securely on its cryptographic storage unit. This storage unit may be local to the IVI system or an external secure storage unit.

In the next step 509, the IVI system receives second user input data. In step 504 the user was prompted to enter the first user input data. And in step 509, as the next point of interaction with the user at the IVI system, the user is asked or prompted to enter the second user input data. In this way the user has to go through a two-step interaction or two levels of authentication before getting an access to the functionalities of the IVI system.

In the following step 510 the IVI system checks if the second user input data entered by the user at the IVI system corresponds to the OTP that was previously stored it its storage unit.

According to the final step 511, when the IVI system determines that the OTP stored in the storage unit matches the second user input data, the IVI system creates a secure container within the IVI system for access by the user. The user may store data in this container, share his/her private data like phone book, call logs, music, social network details etc. The container environment is sandboxed from the IVI host system environment and function independent of each other without affecting each other.

The description of embodiments has been presented for purposes of illustration and description. Suitable modifications and variations to the embodiments may be performed in light of the above without departing from the scope of protection as determined by the claims.

In particular, whilst some of the above examples are described in connection with rental vehicles, the embodiments disclosed herein may also be implemented in other vehicles that have frequent change of users/drivers or vehicles which are more prone to security threats due to the surroundings where it is used or driven in.

What is claimed is:

1. A data protection method for an in-vehicle infotainment (IVI) system, the method comprising:
   receiving user identification data;
   generating a unique token on the basis of the user identification data;
   transmitting the token to a device for presentation to a user;
   receiving, by the IVI system, first user input data;
   transmitting, by the IVI system, the first user input data to a backend server;
   in response to determining that the first user input data corresponds to the token:
     generating, by the backend server, a one-time password (OTP) on the basis of the token, and
     transmitting, by the backend server, the OTP both (1) to the IVI system and (2) to a mobile device of the user;
   receiving, by the IVI system, second user input data; and
   in response to determining, by the IVI system, that the second user input data corresponds to the OTP:
     creating, by the IVI system, a secure container within the IVI system for access by the user that is separate from a host file system of the IVI system,
     creating, by the IVI system, a custom file system on the host file system in the secure container, and
     storing a copy of downloaded user data and one or more user applications associated with the user in the secure container, wherein the one or more user applications execute inside the secure container via the custom file system such that the one or more user applications do not impact applications or data of the host file system.

2. The method according to claim 1, wherein the backend server saves the token in a memory unit.

3. The method according to claim 1, wherein the custom file system exists on the host file system as a directory and is protected through host security policies.

4. The method according to claim 3, wherein the host security policies are active security policies.

5. The method according to claim 1, wherein the user identification data comprises at least one of a user's name, a user's mobile number, a user's address, a user's e-mail address, a user's driving license number, a user's personal identification information, or a user's biometric information.

6. The method according to claim 1, further comprising:
in response to the user logging out of the IVI system:
backing up, by the IVI system, the copy of the downloaded user data associated with the user stored in the secure container on a backup server,
deleting, by the IVI system, the secure container from the IVI system, and
instructing, by the IVI system, the backend server to delete information associated with the user.

7. The method according to claim 6, wherein the backup server is available as a cloud based service and the backup of the downloaded user data is stored in a network cloud.

8. The method according to claim 1, wherein communication between the backend server and the IVI system is performed over a secure communication channel.

9. The method according to claim 1, wherein the IVI system comprises an automotive infotainment head unit in a car shared by a plurality of users.

10. The method according to claim 1, wherein the secure container is created only temporarily and/or data is stored within the secure container only temporarily.

11. A system comprising:
a backend server comprising a first processor and a first memory; and
an in-vehicle infotainment (IVI) system comprising a second processor and a second memory;
wherein, when executing instructions, the first and second processors are configured to execute a computer-implemented method comprising:
receiving, by the backend server, user identification data;
generating, by the backend server, a unique token on the basis of the user identification data;
transmitting, by the backend server, the token to a device for presentation to a user;
receiving, by the IVI system, first user input data;
transmitting, by the IVI system, the first user input data to the backend server;
in response to determining that the first user input data corresponds to the token,
generating, by the backend server, a one-time password (OTP) on the basis of the token, and
transmitting, by the backend server, the OTP both (1) to the IVI system and (2) a mobile device of the user; and
receiving, by the IVI system, second user input data; and
in response to determining, by the IVI system, that the second user input data corresponds to the OTP:
creating, by the IVI system, a secure container within the IVI system for access by the user that is separate from a host file system of the IVI system,
creating, by the IVI system, a custom file system on the host file system in the secure container, and
storing a copy of downloaded user data and one or more user applications associated with the user in the secure container,
wherein the one or more user applications execute inside the secure container via the custom file system such that the one or more user applications do not impact applications or data of the host file system.

12. The system of claim 11, wherein the transmitted OTP is stored on a local cryptographic storage unit in the IVI system.

13. One or more non-transitory computer-readable media including instructions that, when executed by a system, cause the system to perform the steps of:
receiving user identification data;
generating a unique token on the basis of the user identification data;
transmitting the token to a device for presentation to a user;
receiving, by an in-vehicle infotainment (IVI) system, first user input data;
transmitting, by the IVI system, the first user input data to a backend server;
in response to determining that the first user input data corresponds to the token:
generating, by the backend server, a one-time password (OTP) on the basis of the token, and
transmitting, by the backend server, the OTP both (1) to the IVI system and (2) to a mobile device of the user;
receiving, by the IVI system, second user input data; and
in response to determining, by the IVI system, that the second user input data corresponds to the OTP:
creating, by the IVI system, a secure container within the IVI system for access by the user that is separate from a host file system of the IVI system,
creating, by the IVI system, a custom file system on the host file system in the secure container, and
storing a copy of downloaded user data and one or more user applications associated with the user in the secure container, wherein the one or more user applications execute inside the secure container via the custom file system such that the one or more user applications do not impact applications or data of the host file system.

* * * * *